(No Model.)

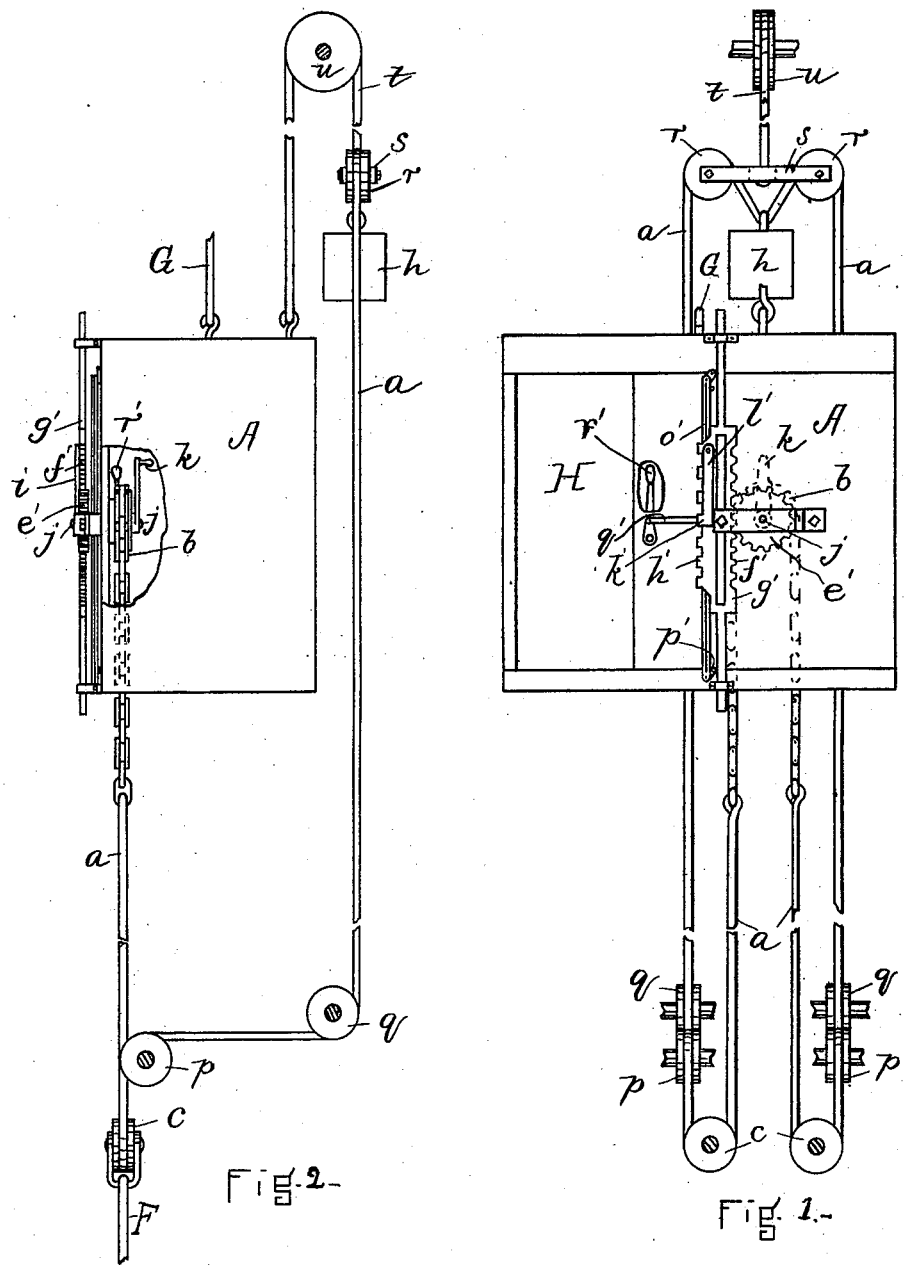

C. A. HARKNESS.
ELEVATOR.

No. 567,095. Patented Sept. 1, 1896.

WITNESSES
Matthew M. Blunt
Marcus B. May

INVENTOR
Chas. A. Harkness
By Arthur W. Crossley
ATT'Y (No Model.) 5 Sheets—Sheet 3.

C. A. HARKNESS.
ELEVATOR.

No. 567,095. Patented Sept. 1, 1896.

WITNESSES
Matthew M. Blunt.
Marcus B. May

INVENTOR:
Chas. A. Harkness
By Arthur W. Crossley,
ATT'Y.

(No Model.) 5 Sheets—Sheet 4.
C. A. HARKNESS.
ELEVATOR.
No. 567,095. Patented Sept. 1, 1896.
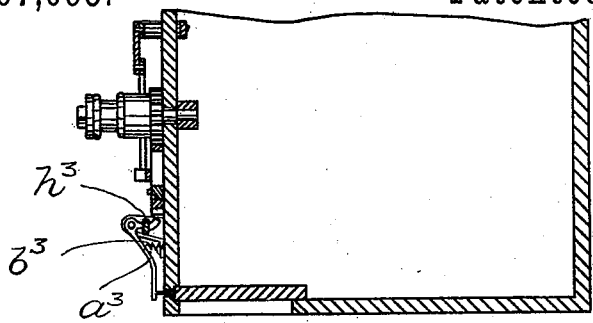
Fig. 13.
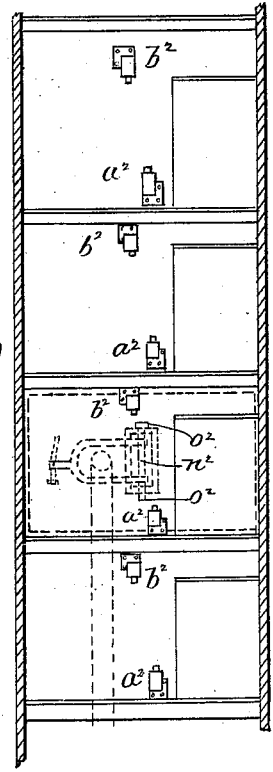
Fig. 9.
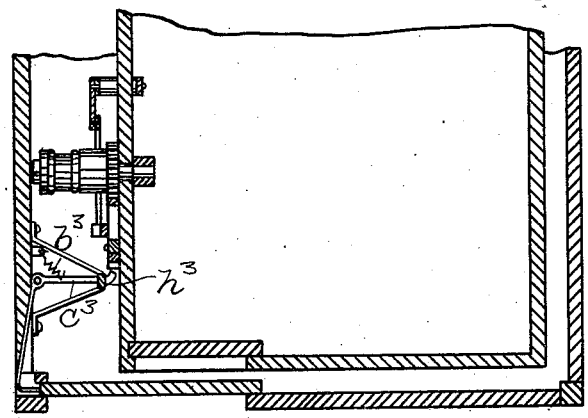
Fig. 14.
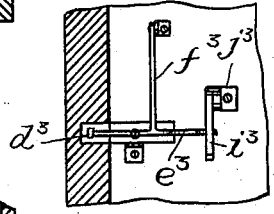
Fig. 17.
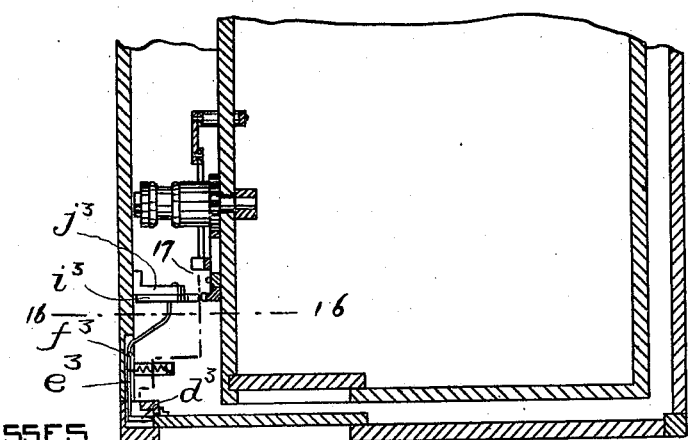
Fig. 15.
Fig. 16.
WITNESSES.
Matthew M. Blunt.
Marcus B. May.
INVENTOR.
Charles A. Harkness
By Arthur W. Crossley
ATT'Y.

(No Model.) 5 Sheets—Sheet 5.

C. A. HARKNESS.
ELEVATOR.

No. 567,095. Patented Sept. 1, 1896.

WITNESSES.
Matthew M. Blunt

INVENTOR.
Charles A. Harkness
By Arthur W. Crassley,
ATT'Y.

UNITED STATES PATENT OFFICE.

CHARLES A. HARKNESS, OF PROVIDENCE, RHODE ISLAND.

ELEVATOR.

SPECIFICATION forming part of Letters Patent No. 567,095, dated September 1, 1896.

Application filed November 4, 1895. Serial No. 567,852. (No model.)

*To all whom it may concern:*

Be it known that I, CHARLES A. HARKNESS, of Providence, in the county of Providence and State of Rhode Island, have invented certain new and useful Improvements in Elevators, of which the following is a specification.

This invention has relation to elevators of the class wherein the controlling-line travels with the car, and is designated as a "running" line, in contradistinction to those operating-lines relatively to which the car travels and known as "standing" lines.

The objects of my invention are, first, the provision of improved means for securing the automatic stoppage of the car with certainty at the landings along the elevator shaft or well; second, the providing of improved means coacting with the door for locking the line through the medium of devices on the car to a stationary support to prevent the starting of the car after the same has been stopped and the door has been opened to any extent until the door has been fully closed, and also to prevent what is termed "creeping," that is, a slight continuous movement of the car in either direction after it has been brought to a state of rest.

To these ends the invention consists in the improvements which I shall now proceed to describe in detail and then point out with particularity in the appended claims.

Reference is to be had to the annexed drawings, and to the letters marked thereon, forming a part of this specification, the same letters designating the same parts or features, as the case may be, wherever they occur.

Figure 3:
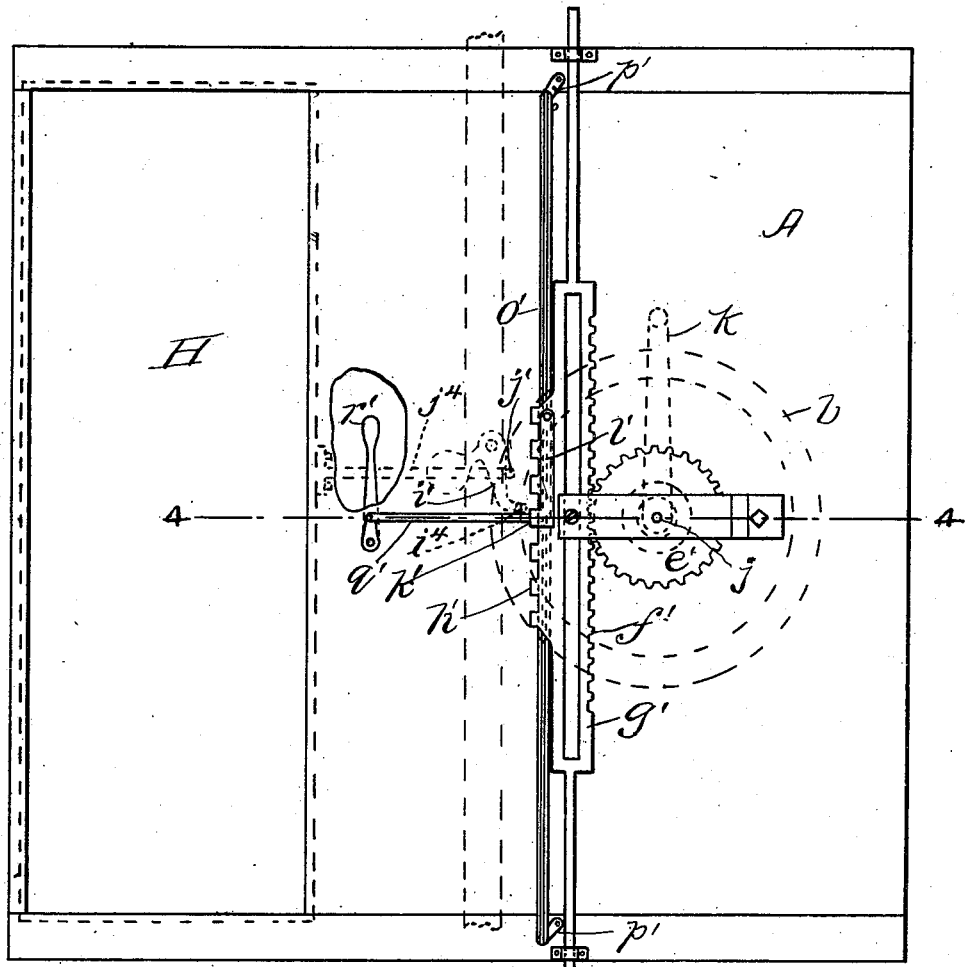
Figure 5:
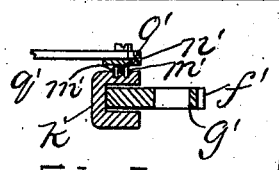
Figure 4:
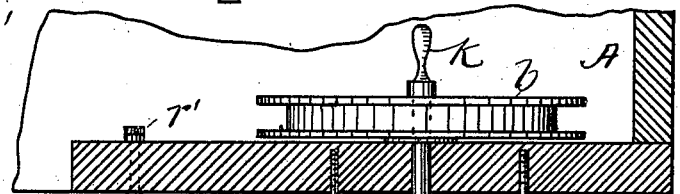
Figure 6:
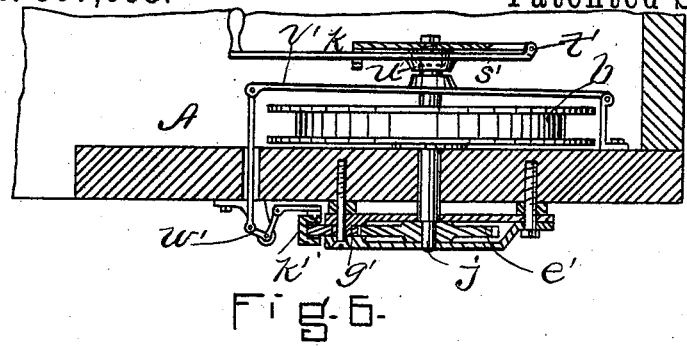
Figure 7:
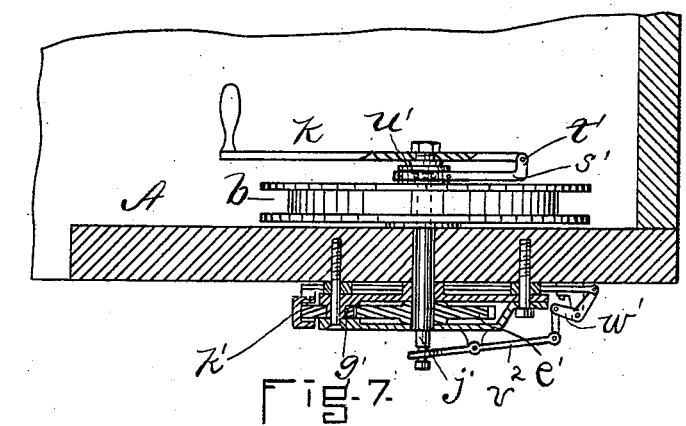
Figure 8:
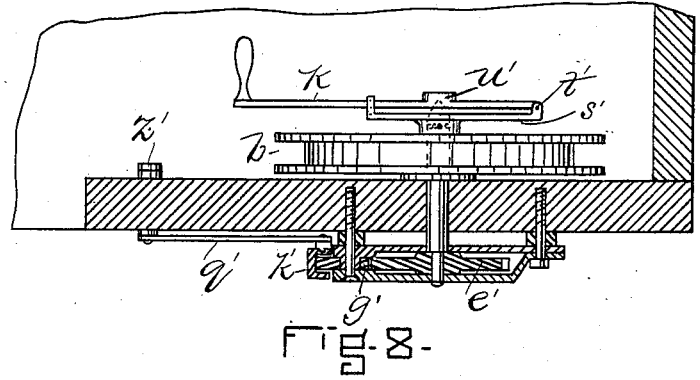
Figure 11:
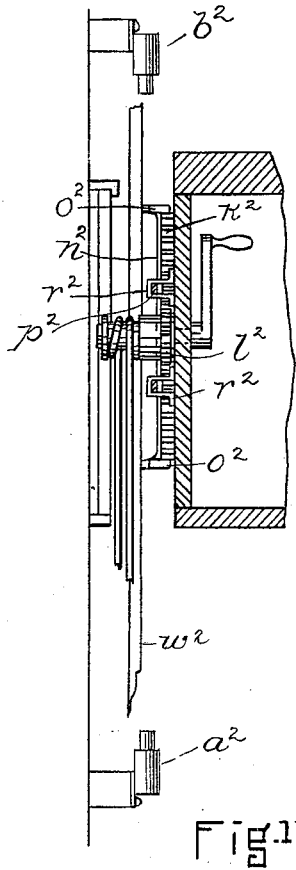
Figure 10:
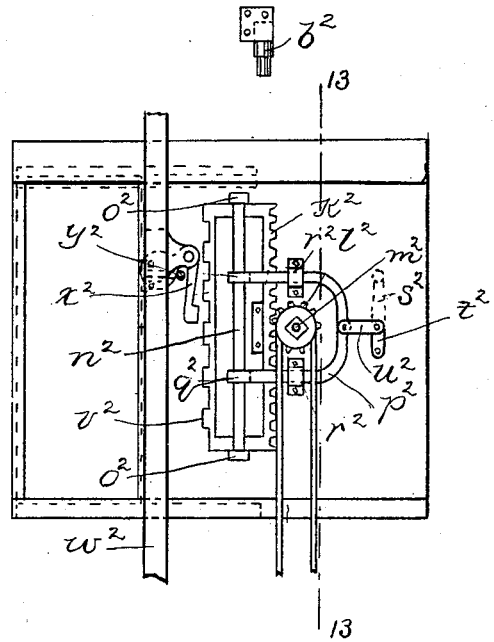
Figure 12:
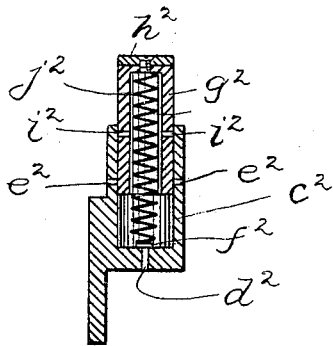

Of the drawings, Figure 1 is a front elevation of an elevator-car equipped with a form of controlling-line and one embodiment of my invention. Fig. 2 is a side elevation of what is illustrated in Fig. 1. Fig. 3 is a front elevation of a car provided with means, as shown in Fig. 1, for automatically effecting a stopping of the elevator-car with certainty at the landings and for locking the line against movement when the door of the corridor is open. Fig. 4 is a sectional view on the line 4 4 of Fig. 3. Fig. 5 is an enlarged cross-section of the rack and swinging tooth, taken on the same line. Figs. 6, 7, and 8 are sectional views similar to Fig. 4, but showing modified devices to be used in connection with the stopping means. Figs. 9, 10, and 11 show modified means for effecting the stopping of the car and locking the line. Fig. 12 is a detail view of one of the cushioning devices. Fig. 13 is a cross-sectional view of a car, showing means to be used in connection with the car-door for locking the rack shown in Fig. 9. Fig. 14 is a similar view showing devices to be used in connection with the corridor-door for effecting the same purpose. Fig. 15 illustrates a modified form of means for accomplishing the same purpose. Figs. 16 and 17 show in detail some of the devices employed in the mechanism illustrated in Fig. 15.

In the drawings, A designates the elevator-car, and $a$ designates the flexible valve-controlling line or rope connected with the car and operatively connected with the valve (not shown) through the medium of pulleys $c$ $c$, connected to the valve-operating means (not shown) by a rope F, a portion of which is shown on the drawings. The said line passes over or around a line-shifting device or means for operating it, consisting in this case of a wheel $b$ inside the car, and extends through openings in the floor of the car in doubled form down and around the pulleys $c$ $c$, thence over pulleys $p$ $p$, under pulleys $q$ $q$, and thence up and over pulleys $r$ $r$, and is finally secured to a weight $h$. The pulleys $r$ are connected by a cross-bar $s$, to which a rope $t$ is attached, the latter passing over a pulley $u$ and down to the car, to which it is secured. These parts just described constitute a carriage for supporting the controlling-line and relieve the car, as well as the line, of shock in sudden starting and stopping, since the weight allows the line to shrink and stretch. The wheel $b$ is fixed on its shaft $j$, and the latter on the inside of the car is provided with a crank or handle $k$, (see Figs. 3 and 4,) by which the wheel may be turned to operate the line $a$ to control the movements of the car, as has been heretofore described. It will be understood that by turning the wheel $b$ in one direction the valve will be operated to raise the car, and by turning it in the opposite direction the car will be lowered, and, further, that when the said wheel is in a middle position the car will be stopped. This method of applying the controlling-line is such that the latter travels with the car and is, as it were, paid out at one of its connections with the car as the latter moves and taken up at the other. The tension device is employed, as has been said, in order that the car may be relieved of shock by a sudden turning of the wheel $b$ to start or stop it, and so that the line may also be relieved of undue strain under the same circumstances, and also that any movement in the line occasioned by stretching or shrinking may be compensated for.

It will be understood that a counterpoise (not shown) may be connected with the car through the medium of the rope or suspensory G.

In Figs. 1, 2, 3, 4, and 5 there is shown one embodiment of my invention providing means for preventing the starting of the car after the car-door is opened to any extent and until it is fully closed, and also means for automatically stopping the car exactly at the landings. In these figures the pulley or wheel $b$ is on the inside of the car, and the line passes through apertures (not shown) in the floor of the car.

Connected with the shaft of the wheel $b$ is a gear-wheel $e'$, which engages the teeth $f'$ on one edge of a vertically-movable rack-bar $g'$, the opposite edge of said rack-bar being provided with teeth $h'$. On a vertical strip in the elevator-shaft there is provided a projection consisting of a weighted dog or latch $i'$, (shown in dotted lines,) having its end $i^4$ bent laterally, which, when left free, is constructed and arranged so as to engage the teeth $h'$ of the rack-bar, and so hold the latter, and consequently the pulley $b$, against movement, as will be understood without further description.

On the door H of the corridor is an arm $j^4$, having a lateral pin $j'$, which, when the door is fully closed, engages the dog $i'$ and moves it back against the stress of its weight, as shown in Fig. 3, and disengages it from the teeth $h'$ of the rack-bar and allows of the free operation of the pulley $b$; but the moment the door H is moved to any extent toward open position the dog $i'$ will be freed to engage the teeth $h'$ of the rack-bar and hold it locked, and also lock the wheel $b$, so that the line cannot be operated to move the car.

One of the teeth $h'$ of the rack-bar $g'$, as at $k'$, is formed on the lower end of a bar $l'$, pivoted at its upper end upon the rack-bar, the said tooth $k'$ straddling said bar, as shown in Fig. 5, and from the side of said tooth $k'$, or it may be the bar $l'$, there project two pins $m'$, which extend on opposite sides of a rib $n'$, formed on the side of a vertically-arranged bar $o'$, pivotally connected at its ends by means of links $p'$ with the car. A link or pitman $q'$ is pivoted at one end to the bar $o'$ and at the other end to a crank on the pivot-shaft of lever $r'$, fulcrumed on the car, so that when the elevator in its movements is approaching a landing the attendant in the car by the movement of the lever $r'$ may, through the medium of bar $o'$, draw the tooth $k'$ on the lower end of the bar $l'$ out, so that the dog or latch $i'$ may engage it and in the further movement of the car shift the rack-bar $g'$ and move the wheel $b$ through the medium of the gear-wheel $e'$ and operate the line to stop the car. The moment the lever $r'$ is released the gravity of the bar $o'$ will restore the parts connected therewith to normal position.

In Fig. 6 the handle or crank $k$ is provided with an extension $s'$, pivoted at $t'$ upon a bracket loosely supported by the shaft of the pulley $b$, so that the said handle or crank is movable longitudinally of the shaft, and is provided with a clutch-part $u'$, (shown in dotted lines,) adapted to coöperate with a similar clutch part on the said shaft. When the said wheel is to be turned in order to operate the line and effect a movement of the car, the said clutch parts are engaged; but when it is desired to draw out the tooth $k'$ on the lower end of the pivoted bar $l'$ to automatically stop the car at a landing, as before described, the handle or lever $k$ will be pressed inward, disengaging the said clutch parts and pressing against a pivoted bar $v'$, operatively connected with the bar $o'$ and the tooth $k'$ through the medium of a bell-crank lever $w'$ and connecting-links, so as to draw said bar $o'$ out, with the result before explained. The handle $k$, being disengaged, does not revolve when the wheel $b$ is rotated by the shifting of the line.

In Fig. 7 the crank or handle $k$ is shown as connected by clutch devices with the tubular shaft of the pulley $b$, so that it may turn the same, and with a spindle passed through the shaft, so that when the said crank is pulled outward it will move said spindle longitudinally, so that the outer end of the latter will act upon a pivoted bar $v^2$, connected with the bar $o'$ and the tooth $k'$, so as to move the latter and effect a stopping at the landings in the manner described.

In Fig. 8 the tooth $k'$ is made operative in a manner similar to that shown in Figs. 3 to 5; but the crank $k$ is provided with a clutch part $u'$, adapted to act with a clutch part on the shaft of the wheel $b$, so that the said crank may be disconnected from the said shaft and not turn with it, when that is desired.

In Figs. 9, 10, 11, and 12 I have shown modified devices which I may employ for stopping the car with certainty at any landing. The results which are attained from the employment of this device are similar to those obtained from the use of those just described. That is to say, the car is stopped with certainty at a particular point regardless of the speed at which it is moving; but in addition to stopping the car with certainty I provide a series of cushioning devices staggered along the hatchway, as shown diagrammatically in Fig. 10, for insuring that it shall be stopped gently and without jarring.

For each landing I employ two stationarily-mounted cushions $a^2 b^2$, which are so placed that the car will be stopped at the proper point with its floor in the horizontal planes of the floor of the landing. Each cushion $a^2 b^2$ is constructed as shown in Fig. 12, it being formed of a hollow cylindrical bracket $c^2$, provided with an air-inlet aperture $d^2$ and air-outlet apertures $e^2$. A valve $f^2$ is provided for the inlet-aperture $d^2$. In this bracket slides an inverted tube $g^2$, closed on the upper end and provided with a rubber or other soft pad $h^2$.

The tube $g^2$ is provided with outlet-apertures $i^2$, which are adapted to coincide with the outlet-apertures $e^2$ in the tubular bracket $c^2$. A spring $j^2$ forces the tube $g^2$ back into place when the weight of the elevator-car has been removed from it. When the weight of the car comes upon the tube, the latter is cushioned in its descent by the compressed air, which does not escape until apertures $e^2 i^2$ coincide, the valve $f^2$ preventing the air from escaping through aperture $d^2$ until the tube begins to rise. At each landing the two cushions $a^2 b^2$ are out of alinement with each other for a purpose now to be set forth. On the car there is a rack-bar $k^2$. It is raised and lowered by a gear-wheel $l^2$ on the shaft $m^2$ of the hand device which controls the operating-rope and slides in suitable guides.

$n^2$ is a rod having projections $o^2$ on the ends, which fit over the ends of the rack, so that the rod can slide transversely of the rack, but will be raised and lowered with it. The rod $n^2$ is shifted transversely, so as to lie in the vertical line of either of the cushions $a^2$ or $b^2$, by means of a fork $p^2$, which has guides $q^2$ for said rod, and which itself is held stationary vertically by means of guides $r^2$. The fork $p^2$ and the rod $n^2$ are moved back and forth by a lever $s^2$, crank $t^2$, and link $u^2$.

The operation of the device is simple. When the car is to travel upward, the hand device is shifted so as to shift the operating-rope. This turns gear-wheel $l^2$, which lifts up the rack $k^2$ and rod $n^2$ accordingly. Then, when it is desired to stop the car at a particular landing, lever $s^2$ is thrown so as to draw rod $n^2$ into vertical alinement with the cushion $b^2$. When the projection $o^2$ on the rod $n^2$ strikes the cushion, the car gradually comes to a state of rest, as the continued movement of the car causes the cushion $b^2$ to push rack-bar $k^2$ downward, which in turn acts to revolve gear-wheel $l^2$ and shift the rope so as to cause the motor to stop; a spring (not shown) connected with the handle $s^2$ returns the mechanism to its neutral position after the car is stopped.

When the cage is traveling downward and it is desired to stop it, the rod $n^2$ is shifted into alinement with the cushion $a^2$.

It will be seen that, when the rope is shifted by means of the lever and gear-wheel $l^2$ to start the car, the rack is raised or lowered, as the case may be, and when the end of the rack strikes against a projection $a^2$ or $b^2$ on the wall of the well the continued movement of the car will cause the rack to be moved back to its normal position, thereby rotating the wheel through the pinion, which will in turn shift the operating-rope and stop the car at an exact predetermined point.

The rack-bar $g'$, bar $l'$, and tooth $k'$ in that form of the invention illustrated in Fig. 3, as well as the rack-bar $k^2$, bar $n^2$, and projection $o^2$ thereof in that embodiment of the invention illustrated in Fig. 10, constitute a projection or a device connected with the line through the line-shifting wheel or device, the movable parts of which (tooth $k'$ and bar $l'$ or bar $n^2$ and projection $o^2$) are thrust into engagement with a projection on the wall of the well by means in each case consisting of a handle and operative connections, so that when the said parts engage the projection the line-shifting wheel is rotated and the car is brought to a state of rest. I do not limit myself to these particular parts or to these embodiments of my invention, as other devices for accomplishing the same functions may be employed without departing from the spirit and scope of my invention.

The rack $k^2$ is on one side of a rectangular frame which has upon its other side a rack $v^2$. This rack is utilized to lock the operative or controlling line against movement when the corridor-door is open either partially or entirely.

Mounted upon the strip $w^2$, which extends along the hatchway, is a weighted dog or latch $x^2$, similar to that at $i'$ in Fig. 3. $y^2$ is a pin secured to the door and operating to hold the dog or latch away from the rack $v^2$ when the door is closed. At the slightest movement of the door toward open position the pin $y^2$ will allow the latch to engage the teeth of the rack and lock it, and therefore the operative or controlling line, against movement until the door is entirely closed.

In Fig. 13 I have illustrated a slightly-modified latch to engage the rack, the latch in this case coacting with the door of the car. It consists of a lever $a^3$, pivoted upon brackets on the car and having its outer end arranged in such way that when the door is closed it will press against it and hold the latch out of engagement with the rack, but as soon as the door is moved so as to release the end of the lever a spring $b^3$ draws the other end of the lever or latch into engagement with the rack.

In Fig. 14 the lever $c^3$ (similar to $a^3$ in Fig. 13) is mounted on the wall of the hatchway and coacts with the corridor or landing door. In Figs. 13 and 14 the lever operates between brackets $h^3$, which relieve it of strain, the said brackets being suitably secured to the wall of the hatchway.

In Figs. 15, 16, and 17 the door strikes against a pin or point $d^3$ on the end of a bar $e^3$, which is secured to a swinging link $f^3$. The bar $e^3$ has its end extending under a weighted dog or latch $i^3$, mounted upon a bracket $j^3$ on the wall of the well. When the door is closed, it presses against the point $d^3$ and holds the bar $e^3$, and therefore the latch $i^3$, back, but as soon as the door is moved slightly toward an open position the weight on the latch throws the bar forward and allows the end of the latch to enter between the teeth $k^3$, formed in this case on the front face of the rack.

Reference to Figs. 13, 14, 15, 16, and 17 shows that the doors of the elevator-car and of the corridor are on a side of the car different from that on which the line-shifting device is located. In Fig. 13 the line-locking mechanism operates in conjunction with the car-door, while in Figs. 14 and 15 the opening of the corridor-door locks the line. In all of these devices the opening of the doors causes the locking of the rack and the operating-line, so that the car is prevented from moving at that time. Again, all of these locking devices (except that illustrated in Fig. 13) act to prevent what is technically termed "creeping," (i. e., a slight movement of the car in either direction, which may be caused in any of a number of ways,) for the engagement of the latch stationarily mounted on the wall of the well with the rack on the car will cause the movement of the pinion and controlling-line wheel in a direction to stop the car in case it should start after it has been brought to a standstill and the latch has been engaged with the rack. While by a device connected with said line but movable independently thereof for engaging a projection on the wall of the well I refer to the tooth $k'$ in the form of the invention illustrated in Fig. 3 and to the projection $o^2$ in the form illustrated in Figs. 10 and 11, yet it will be understood that I do not limit myself to those specific devices, as any other equivalent device performing the same functions may be employed.

On the drawings I have illustrated the line conventionally, but it will be understood that I may form that part of it which passes around the wheel as a rope or as a sprocket-chain, suiting the wheel to the particular kind of line employed.

I do not herein make claim to the means on the car for shifting the line to operate the car, secondary mechanism for stopping the car, and a single handle adapted to be connected to both said line-shifting means and the secondary mechanism; nor do I herein make claim to clutch mechanism interposed between the lever and the shaft, as illustrated in Figs. 6, 7, and 8, nor to locking a line traveling with the car by means coacting with the door, nor to a latch held back by the door but adapted to lock the line when the door is partially or entirely open, nor to any other of the features which are likewise shown and described in this and my other copending application, Serial No. 565,955, filed October 17, 1895, and claimed in said last-mentioned application.

Having thus described several devices in which my invention may be embodied, I therefore declare that what I claim is—

1. A controlling and stopping device for elevators, comprising a controlling-line, a projection on the wall of the well, a device connected with said line but movable independently thereof, and means for throwing said device out to engage said projection.

2. A controlling and stopping device for elevators, comprising a controlling-line traveling with the car, a wheel on the car for operating the said line, mechanism for rotating the said wheel, means on the wall of the well with which said mechanism may be engaged, and means which may be operated independently of the said wheel for throwing said mechanism into engagement with the said means on the wall of the well.

3. A controlling and stopping device for elevator-cars, comprising a controlling-line, a device on the car for shifting said line, a longitudinally-movable vertical bar operatively connected with said device, and a projection on the wall of the well to engage said bar.

4. A controlling and stopping device for elevator-cars, comprising a controlling-line, a device on the car for shifting said line, a pinion connected with said device, a rack-bar meshing with said pinion, and a projection on the wall of the well to engage said rack-bar.

5. In an elevator, the combination of the car, an operating-line traveling with the car, a line-shifting wheel on the car, a projection on the wall of the well, a device connected to the line-shifting wheel whereby it is moved vertically when the said wheel is rotated, and means for throwing said device into vertical alinement with the said projection, whereby when the device engages said projection it will rotate said wheel and automatically bring the car to a state of rest, substantially as set forth.

6. In an elevator, the combination of the car, an operating-line, a line-shifting wheel on the car, a pinion connected therewith, a rack-bar, a projection on the wall of the well, and a movable device connected with said rack-bar and means for moving said device so as to engage said projection to thereby stop the car, substantially as set forth.

7. An elevator apparatus, comprising in its construction, a car, a wheel thereon, and means to actuate it, a controlling-line connected with the said wheel to be actuated thereby, a gear-wheel operatively connected with the said wheel, a longitudinally-movable rack-bar with which the said gear-wheel engages, the said rack-bar being provided with a second toothed or rack part, a latch, and a movable door coacting with said latch to allow it to engage with the rack-bar when the door is moved open to any extent.

8. An elevator apparatus, comprising in its construction, a car, a wheel thereon, means to actuate the wheel, a line connected with said wheel to be actuated thereby, a pinion operatively connected with the wheel, a movable device engaging the teeth of the said pinion, a latch adapted when in normal position to engage the said movable device, and a pin on a movable door to engage the latch when the door is closed to hold it out of engagement with the said movable device, but release it when the door is moved to any extent toward open position.

9. In an elevator, the combination with the motor-controlling devices, and a series of cushioning devices mounted on the wall of the well, of a movable projection on the car, connected with said motor-controlling devices, and means for moving said projection so as to engage said cushioning devices, substantially as set forth.

10. In an elevator, the combination, with a car, a controlling-line, and a series of cushioning devices, staggered along the hatchway and two of said devices arranged adjacent each landing, of a device on the car operatively connected with the controlling-line, and adapted to be brought into position to engage the cushioning devices to stop the car in its ascent or descent.

11. A cushioning device for an elevator, consisting of a tubular bracket having air-inlet apertures and air-outlet apertures, a valve for said air-inlet, a tube in said bracket having its outer end closed, and having air-outlet apertures adapted to coincide at predetermined points with the air-outlet apertures of the tubular bracket, and a spring interposed between said tube and said bracket.

12. An elevator apparatus, comprising a car, a series of yielding cushioning devices in the elevator-well, a controlling-line and a controlling device for said line on the car and adapted to impinge upon said cushioning device to stop the car.

13. An elevator apparatus, comprising a car, a series of yielding cushioning devices arranged in the elevator-well and motor-controlling devices constructed and arranged so as to be moved into engagement with one of the cushioning devices to shift the motor and stop the travel of the car.

In testimony whereof I have signed my name to this specification, in the presence of two subscribing witnesses, this 20th day of November, A. D. 1894.

CHARLES A. HARKNESS.

Witnesses:
ARTHUR W. CROSSLEY,
C. C. STECHER.